United States Patent [19]

Rutledge

[11] 3,894,094
[45] July 8, 1975

[54] HALOGENATED, TETRA-ALKYL BIPHENOLS

[75] Inventor: Thomas F. Rutledge, Wilmington, Del.

[73] Assignee: ICI United States Inc., Wilmington, Del.

[22] Filed: Dec. 4, 1972

[21] Appl. No.: 311,496

[52] U.S. Cl............................. 260/620; 260/396 R
[51] Int. Cl... C07c 37/00; C07c 49/62; C07c 39/12
[58] Field of Search................................... 260/620

[56] References Cited
UNITED STATES PATENTS

| | | | |
|---|---|---|---|
| 2,479,948 | 8/1949 | Luten et al. | 260/620 X |
| 2,785,188 | 3/1957 | Coe | 260/620 X |
| 3,328,455 | 6/1967 | Schmukler | 260/620 X |
| 3,491,128 | 1/1970 | Dewhirrst | 260/620 X |
| 3,720,721 | 3/1973 | Becker et al. | 260/620 |

OTHER PUBLICATIONS

Auwers et al., "Berichte," Vol. 38, pp. 226–237, (1904).

Primary Examiner—Bernard Helfin
Assistant Examiner—Norman Morgenstern

[57] ABSTRACT

Halogenated, tetra-alkyl biphenols are disclosed. These materials have the following general formula:

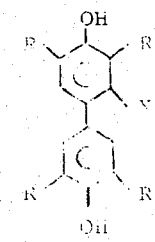

wherein R is $C_1$ to $C_3$ alkyl and X is chlorine, bromine, or fluorine. These materials are prepared by reacting a solution of a tetra-alkyl diphenoquinone in an inert solvent with a hydrogen halide of the general formula, HX, wherein X is as defined above.

6 Claims, No Drawings

HALOGENATED, TETRA-ALKYL BIPHENOLS

BACKGROUND OF THE INVENTION

1. Field of the Invention

The present invention relates generally to halogenated, tetra-alkyl biphenols and to a method of preparing said compounds. More particularly, the present invention relates to biphenols having the following general formula:

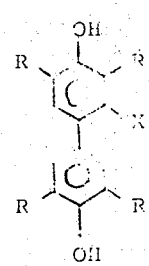

wherein R is $C_1$ to $C_3$ alkyl and X is chlorine, bromine, or fluorine. These materials are prepared by reacting a tetra-alkyl diphenoquinone dissolved in a suitable solvent with a compound of the general formula, HX, wherein X is as defined above.

2. Description of the Prior Art

It is now well known in the art that a mono-nuclear quinone, such as benzoquinone, will react with a hydrogen halide, such as HCl, to form a halogenated benzene diol. The reaction is generally carried out by introducing a dry hydrogen halide, such as HCl gas, into a solution of the benzoquinone in an inert solvent. As disclosed in U.S. Pat. No. 3,396,178 issued to Marmer, a combination of aqueous hypochlorous acid and an organic peroxide has also been used to convert a benzoquinone or a naphthoquinone to the corresponding chloroquinone. The preparation of halogenated benzene diols from benzoquinones is believed to involve a 1,4 addition followed by a proton shift.

A variety of diphenoquinones, including the tetra-alkyl derivatives thereof, have been reported in the literature. The tetra-alkyl derivatives and methods of preparing them are disclosed, for example, in U.S. Pat. No. 3,555,052 issued to Yonemitsa and in U.S. Pat. No. 3,210,384 issued to Hay.

It is also well known that the diphenoquinones may be reduced to form the corresponding biphenols. However, halogenated, tetra-alkyl biphenols have not previously been reported.

SUMMARY OF THE INVENTION

In accordance with the present invention, halogenated, tetra-alkyl biphenols are prepared having the following general formula:

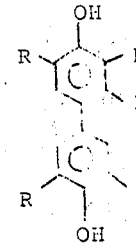

wherein R is $C_1$ to $C_3$ alkyl and X is equal to chlorine, bromine, or fluorine. These materials are prepared by reacting a tetra-alkyl diphenoquinone dissolved in a suitable solvent with a compound of the general formula, HX, wherein X is as defined above.

DESCRIPTION OF THE PREFERRED EMBODIMENTS

As mentioned above, halogenated, tetra-alkyl biphenols are prepared in accordance with the present invention. These materials have the following general formula:

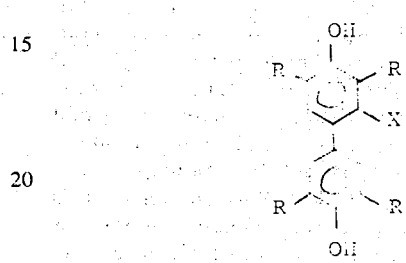

wherein R is $C_1$ to $C_3$ alkyl and X is selected from the group consisting of chlorine, bromine, and fluorine. The preferred materials of the present invention are those in which R is equal to methyl and X is chlorine.

The biphenols of the present invention are prepared by reacting a suitable diphenoquinone dissolved in an inert solvent with a hydrogen halide.

The diphenoquinones which may be employed as the starting material in the preparation of biphenols in accordance with the present invention are those having the following general formula:

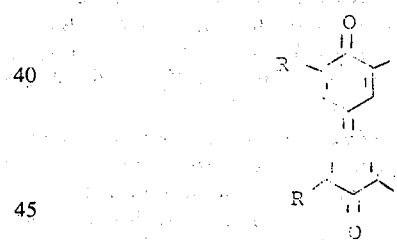

wherein R is equal to $C_1$ to $C_3$ alkyl. The preferred material for use in the present invention is tetramethyl diphenoquinone.

In preparing the halogenated biphenols of the present invention, the diphenoquinone is first dissolved in an inert solvent. The particular solvent employed is not critical to the present invention and any organic solvent which both dissolves the diphenoquinone and does not react with the hydrogen halide may be utilized. Solvents which may be employed in carrying out the present invention include, for example, methylene chloride, trichloroethylene, chloroform, and carbon tetrachloride. Of these, it is preferred to employ methylene chloride.

Although it is not essential to the preparation of biphenols in accordance with the present invention, preferred results have been achieved when a second solvent, referred to herein as a mutual solvent or co-solvent, is added to the solution of diphenoquinone. Any solvent which is miscible with water and with the inert solvent used to dissolve the diphenoquinone and which does not react with the hydrogen halide employed may be utilized as the mutual solvent. Mutual solvents which may be employed include, for example, methanol, ethanol, propanol, isopropanol, acetone, glacial acetic acid, and the like. The amount of mutual solvent employed has not been found to be narrowly critical to the preparation of the biphenols of the present invention. However, for most applications, it has been found that an amount of mutual solvent equal to from about 15 to about 30% of the total volume is sufficient.

To the solution of diphenoquinone, there is then added a hydrogen halide selected from the group consisting of hydrogen chloride, hydrogen bromide, and hydrogen fluoride. Of these, it is preferred to employ hydrogen chloride. The hydrogen halide may be added either as a dry gas or as an aqueous solution. If added as a gas, it is preferred to include an amount of water in the reaction mixture. Of the hydrogen halides, it is especially preferred to employ an aqueous solution of hydrogen chloride, such as concentrated hydrochloric acid. The amount of hydrogen halide employed should be equal to at least 1 mol per mol of diphenoquinone. However, optimum reaction rates have been achieved when an excess of hydrogen halide is employed and it is, therefore, preferred to employ up to about 100 mols of hydrogen halide per mol of diphenoquinone.

The reaction is carried out by stirring the solution of diphenoquinone and hydrogen halide. The reaction is carried out at a temperature of from about 10°C. to about the boiling point of the solvent. Although temperatures above the boiling point may be employed, no advantage is gained thereby and the complications introduced, such as the necessity for refluxing or carrying out the reaction under pressure, are undesirable especially when the reaction is conducted on a large scale. Preferred results have been achieved at reaction temperatures in the range of from about 20°C. to about 40°C.

The completion of the reaction is indicated by the change in color of the reaction mixture from red to yellow. In most cases, this change is noted after a reaction time of from about 5 to about 15 hours. At this time, the product is isolated by separating the organic solvent layer in which the product is soluble and removing the solvent to recover a solid product.

The halogenated, tetra-alkyl biphenols prepared in accordance with the present invention are useful in a variety of applications including, for example, as monomers in the preparation of polyesters, polysulfones, polycarbonates, polyepoxides, and the like.

In order to describe the present invention so that it may be more clearly understood, the following examples are set forth. These examples are set forth primarily for the purpose of illustration and any enumeration of detail contained therein should not be interpreted as a limitation on the concept of the present invention.

EXAMPLE 1

Into a reaction flask equipped with a stirrer, thermometer, and reflux condenser, there was added 2.4 grams of tetramethyl diphenoquinone dissolved in 250 ml. of methylene chloride and 100 ml. of concentrated hydrochloric acid. The resulting reaction mixture was stirred for 3½ hours, at the end of which time 100 ml. of methanol were added. Upon the addition of the methanol, a rapid exothermic reaction occurred. After stirring an additional 7 hours, the light yellow methylene chloride layer was separated and washed with water. The methylene chloride was removed by evaporation resulting in a solid product. The product was purified by dissolving in methanol, treating the solution with activated carbon, and diluting the warm methanol solution with water until the cloud point was reached. The solution was then cooled to 20°C. and the resulting crystals filtered and dried. There resulted 1.45 grams of light tan crystals having a melting point of 206°C. and containing 12.74% chlorine. The theoretical amount of chlorine in the mono-chloro, tetra-methyl diphenoquinone was calculated as 12.8%.

EXAMPLE 2

Into a reaction flask equipped with a stirrer, thermometer, and reflux condenser, there was added 19.2 grams of tetramethyl diphenoquinone, 500 ml. of methylene chloride, and 200 ml. of methanol. The resulting solution was stirred and 150 ml. of concentrated HCl were added. The mixture was maintained at a temperature in the range of from 33°C. to 37°C. for 14 hours, at the end of which time the yellow methylene chloride layer was separated and the product recovered as in Example 1. The yield of chlorinated tetramethyl biphenol was equal to 72.5%.

EXAMPLE 3

Into a reaction flask equipped with a stirrer, thermometer, and reflux condenser, there was added 4.8 grams of tetramethyl diphenoquinone, 300 ml. of methylene chloride, and 100 ml. of methanol. The resulting solution was stirred and 100 ml. of concentrated hydrochloric acid were added. After heating at a temperature in the range of from 27°C. to 39°C. for 7 hours, the yellow methylene chloride layer was separated and the product recovered as in Example 1. The yield of tetramethyl biphenol was equal to 90%.

EXAMPLE 4

Into a reaction flask equipped with a stirrer, thermometer, and reflux condenser, there is added 4.8 grams of tetramethyl diphenoquinone, 295 ml. of methylene chloride, 55 ml. of acetone, and 60 ml. of water. The resulting solution is stirred and HBr gas is bubbled into the reaction mixture. After stirring at room temperature for 15 hours, the methylene chloride layer is separated and the brominated tetramethyl biphenol recovered as in Example 1.

What is claimed is:

1. A method of preparing a chlorinated, tetra-alkyl biphenol, said method comprising reacting a 3,3',5,5'-tetra-$C_1$-$C_3$-alkyl diphenoquinone dissolved in a halogenated hydrocarbon with HCl, said reaction being carried out at a temperature of from about 10°C. to about the boiling point of the solvent.

2. A method, as claimed in claim 1, wherein the tetra-alkyl diphenoquinone has the following general formula:

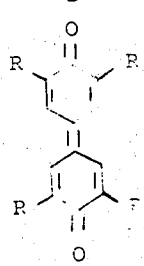

wherein R is $C_1$ to $C_3$ alkyl.

3. A method, as claimed in claim 2, wherein R is $C_1$ alkyl.

4. A method, as claimed in claim 1, wherein a mutual solvent selected from the group consisting of methanol, ethanol, propanol, isopropanol, acetone and glacial acetic acid, is added to the diphenoquinone solution in an amount of from about 15 to about 30% of the total volume.

5. A method, as claimed in claim 4, wherein the mutual solvent is methanol.

6. A method, as claimed in claim 1, wherein the reaction is carried out by stirring at a temperature of from about 20°C. to about 40°C.

* * * * *